United States Patent
Wu et al.

(10) Patent No.: US 12,422,617 B2
(45) Date of Patent: Sep. 23, 2025

(54) PHOTONIC INTEGRATED CIRCUIT INCLUDING PASSIVE OPTICAL GUARD

(71) Applicant: GlobalFoundries U.S. Inc., Malta, NY (US)

(72) Inventors: Zhuojie Wu, Port Chester, NY (US); Yusheng Bian, Ballston Lake, NY (US); Andreas D. Stricker, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 41 days.

(21) Appl. No.: 17/807,257

(22) Filed: Jun. 16, 2022

(65) Prior Publication Data

US 2023/0408763 A1    Dec. 21, 2023

(51) Int. Cl.
*G02B 6/122* (2006.01)
*G02B 6/12* (2006.01)
*G02B 6/13* (2006.01)

(52) U.S. Cl.
CPC ............ *G02B 6/122* (2013.01); *G02B 6/13* (2013.01); *G02B 2006/12126* (2013.01)

(58) Field of Classification Search
CPC .............................. G02B 6/122; G02B 6/13; G02B 2006/12126; G02B 6/12004; G02F 1/025
USPC ........................................ 385/14, 129–132
See application file for complete search history.

(56) References Cited

U.S. PATENT DOCUMENTS

| | | |
|---|---|---|
| 2,557,110 A | 6/1951 | Jaynes |
| 2,619,538 A | 11/1952 | Grant |
| 6,970,611 B1 * | 11/2005 | Van Der Vliet ....... G02B 6/266 257/3 |
| 7,116,880 B1 | 10/2006 | Liu et al. |
| 8,089,285 B2 | 1/2012 | Hsu et al. |
| 8,664,047 B2 | 3/2014 | Lower et al. |
| 9,075,251 B2 | 7/2015 | Dwivedi et al. |
| 11,163,114 B2 | 11/2021 | Bian et al. |
| 2003/0143769 A1 * | 7/2003 | Baek ..................... G02B 6/136 438/41 |
| 2010/0006908 A1 | 1/2010 | Brady |
| 2013/0113968 A1 | 5/2013 | Lenchenkov et al. |

(Continued)

OTHER PUBLICATIONS

Bian et al., "Light manipulation in a monolithic silicon photonics platform leveraging 3D coupling and decoupling," Frontiers in Optics, Laser Science, FTu6E.3.pdf, OSA 2020, 3 pages.

(Continued)

*Primary Examiner* — Michael G Lee
(74) *Attorney, Agent, or Firm* — Francois Pagette; Hoffman Warnick LLC (57) ABSTRACT

The disclosure relates to a PIC structure including a photonic component on a semiconductor substrate. A passive optical guard is composed of a light absorbing material and is in proximity to the photonic component. The passive optical guard includes at least a portion in an active semiconductor layer of the semiconductor substrate and may be entirely below a first metal layer. The passive optical guard may include at least one of: a germanium body positioned at least partially in a silicon element in the active semiconductor layer, a silicon body having a high dopant concentration in the active semiconductor layer, and a polysilicon body having a high dopant concentration over the silicon body.

20 Claims, 11 Drawing Sheets (56) References Cited

U.S. PATENT DOCUMENTS

| | | | |
|---|---|---|---|
| 2015/0192735 | A1 | 7/2015 | Ellis-Monaghan |
| 2017/0168234 | A1 | 6/2017 | Shi |
| 2017/0322373 | A1 | 11/2017 | Shi et al. |
| 2018/0267150 | A1 | 9/2018 | Inada |
| 2019/0025504 | A1 | 1/2019 | Tsujita |
| 2021/0055477 | A1 | 2/2021 | Bian |
| 2021/0149136 | A1 | 5/2021 | Nomura |
| 2021/0167230 | A1 | 6/2021 | Pelletier |
| 2021/0396929 | A1 | 12/2021 | Bian et al. |
| 2022/0149098 | A1* | 5/2022 | Wang ............... H01L 31/107 |
| 2023/0113261 | A1* | 4/2023 | Augur ............ H01L 23/53295 257/734 |

OTHER PUBLICATIONS

Bian et al., "3D silicon photonic interconnects and integrated circuits based on phase matching," 2021 IEEE 71st Electronic Components and Technology Conference (ECTC), 2279-84, 6 pages.

Lockwood et al., "Optical Properties of Germanium Dots Self-Assembled on Porous TiO2 Templates," ECS Transactions, 33:147-165, 2011, 20 pages.

Shen et al., "Increasing the density of passive photonic-integrated circuits via nanophotonic cloaking," Nature Communications, 7:13126, Nov. 2016, 9 pages.

Yakimov et al., "Electromodulated reflectance study of self-assembled Ge/Si quantum dots." Nanoscale Research Letters, 6:208, 2011, 5 pages.

Aboketaf et al., "Towards fully automated testing and characterization for photonic compact modeling on 300-mm wafer platform," W6A.1, OFC 2021, OSA 2021, 3 pages.

Bian et al., "3D Integrated Laser Attach Technology on 300-mm Monolithic Silicon Photonics Platform," 978-1-7281-5891-4/20, IEEE 2020, 2 pages.

Bian et al., "Towards low-loss monolithic silicon and nitride photonic building blocks in state-of-the-art 300mm CMOS foundry," FW5D.2, Frontiers in Optics, Laser Science, OSA 2020, 2 pages.

Bian et al., "Monolithically integrated silicon nitride platform," Th1A.46, OFC 2021, OSA 2021, 3 pages.

Bian et al., "Hybrid III-V laser integration on a monolithic silicon photonic platform," M5A.2, OFC 2021, OSA 2021, 3 pages.

Chowdhury et al., "High Performance Avalanche Photodiode in a Monolithic Silicon Photonics Technology," W3D.1, OFC 2022, Optica Publishing Group 2022, 3 pages.

Giewont et al., "300-mm Monolithic Silicon Photonics Foundry Technology," IEEE Journal of Selected Topics in Quantum Electronics, 25:8200611, Sep./Oct. 2019, 12 pages.

Peng et al., A CMOS Compatible Monolithic Fiber Attach Solution with Reliable Performance and Self-Alignment, Th3I.4, OFC 2020, OSA 2020, 3 pages.

Rakowski et al., "45nm CMOS—Silicon Photonics Monolithic Technology (45CLO) for next-generation, low power and high speed optical interconnects," T3H.3, OFC 2020, OSA 2020, 3 pages.

U.S. Appl. No. 17/525,327, filed Nov. 12, 2021, entitled Bragg Reflector for Photonic Chip Security Structure, 37 pages.

U.S. Appl. No. 17/525,293, filed Nov. 12, 2021, entitled Photonic Chip Security Structure, 24 pages.

Non Final Office Action mailed Jan. 29, 2025 for U.S. Appl. No. 17/932,868, filed Sep. 16, 2022; pp. 36.

Final Office Action mailed May 15, 2025 for U.S. Appl. No. 17/932,868, filed Sep. 16, 2022; p. 15.

* cited by examiner

PHOTONIC INTEGRATED CIRCUIT INCLUDING PASSIVE OPTICAL GUARD

BACKGROUND

The present disclosure relates to semiconductor structures and, more particularly, to a photonic integrated circuit including a passive optical guard for a photonic component and methods of manufacture.

Photonic integrated circuits (PICs) can be made using existing semiconductor fabrication techniques, and because silicon is already used as the substrate for most integrated circuits, it is possible to create hybrid devices in which the optical and electronic components are integrated onto a single microchip. PICs include a variety of photonic components that receive and/or output optical signals. Certain optical components in a PIC, such as optical input/output couplers, laser couplers, among others, can create stray optical signals. The stray optical signals are scattered through the PIC structure and create background optical noise. The stray optical signals received by an unintended photonic component, e.g., a photodetector, may create operational problems for that component.

SUMMARY

An aspect of the disclosure is directed to a photonic integrated circuit (PIC) structure, comprising: a photonic component on a semiconductor substrate; and a passive optical guard composed of a light absorbing material and in proximity to the photonic component, the passive optical guard including at least a portion positioned in an active semiconductor layer of the semiconductor substrate.

Another aspect of the disclosure includes a photonic integrated circuit (PIC) structure, comprising: a photonic component on a semiconductor substrate; and a passive optical guard composed of a light absorbing material and in proximity to the photonic component, the passive optical guard entirely below a first metal layer and including at least a portion in an active semiconductor layer of the semiconductor substrate, wherein the passive optical guard includes at least one of: a germanium body positioned at least partially in a silicon element in the active semiconductor layer, a silicon body having a high dopant concentration in the active semiconductor layer, and a polysilicon body having a high dopant concentration over the silicon body.

Another aspect of the disclosure is directed to a method, comprising: forming a photonic component on a semiconductor substrate; and forming a passive optical guard composed of a light absorbing material and in proximity to the photonic component, the passive optical guard entirely below a first metal layer and positioned in at least a portion in an active semiconductor layer.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure relate to a PIC structure including a photonic component on a semiconductor substrate. A passive optical guard is in proximity to the photonic component. The passive optical guard includes at least a portion positioned in an active semiconductor layer of the semiconductor substrate and may be entirely below a first metal layer. The passive optical guard may include at least one of: a germanium body positioned at least partially in a silicon element in the active semiconductor layer, a silicon body having a high dopant concentration in the active semiconductor layer, and a polysilicon body having a high dopant concentration over the silicon body. The passive optical guard reduces optical noise and improves performance for functional components and circuits (e.g., dark current reduction, scattering loss reduction). The passive optical guard is fully compatible with current semiconductor process flows may not require additional layers and/or process steps. The optical guard can be placed in any area where stray optical signals (light scattering) are anticipated, such as but not limited to in proximity to optical input/outputs such as an edge coupler, laser cavity/coupler, V-groove and input/out for single mode fiber (IOSMF), grating coupler, or chip edges; in proximity to waveguide bends, couplers, splitters, spiral absorbers, etc.; and/or surrounding sensitive photonic components such as photodetectors and/or optical modulators.

Figure 1:
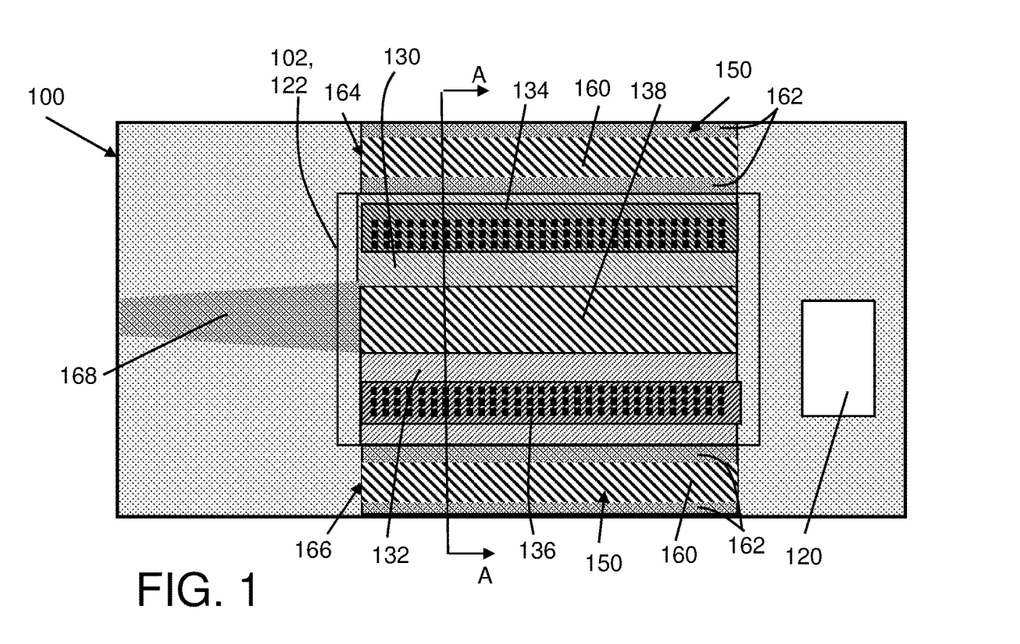
FIG. 1 shows a schematic top-down view of a PIC structure, according to embodiments of the disclosure.
Figure 2:
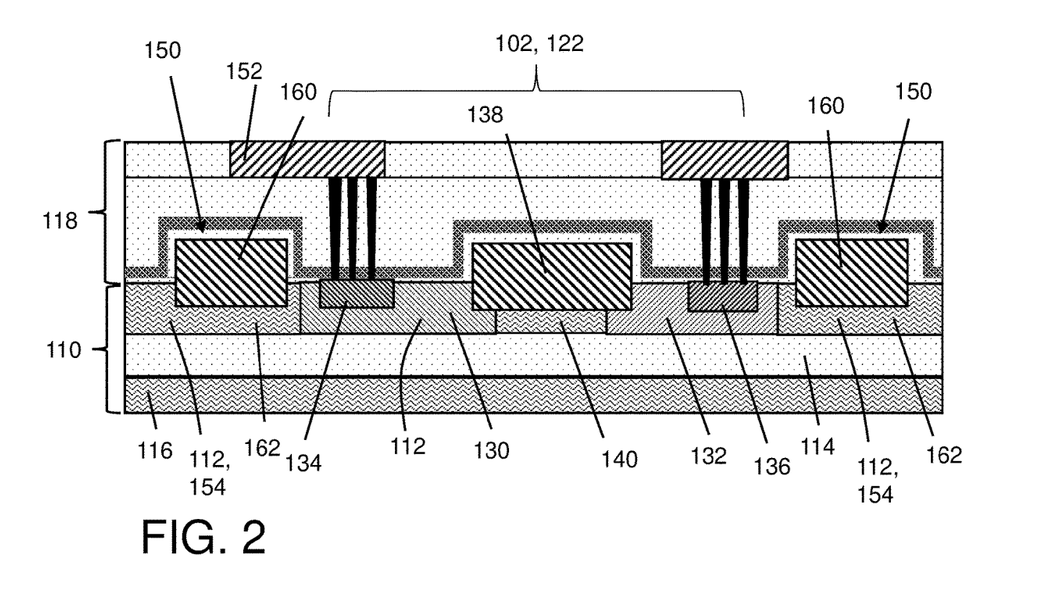
FIG. 2 shows a cross-sectional view of a PIC structure along view line A-A in FIG. 1, according to embodiments of the disclosure.

FIG. 1 shows a schematic top-down view and FIG. 2 shows a cross-sectional view of a PIC structure 100 along view line A-A in FIG. 1, according to embodiments of the disclosure. PIC structure 100 includes a photonic component 102 on a semiconductor substrate 110. More specifically, PIC structure 100 includes semiconductor substrate 110, which may include any now known or later developed semiconductor substrate. In the non-limiting example shown, semiconductor substrate 110 includes a layered semiconductor-insulator-semiconductor substrate in place of a more conventional silicon substrate (bulk substrate). As shown in FIG. 2, semiconductor substrate 110 includes a semiconductor-on-insulator (SOI) layer 112 over a buried insulator layer 114 over a base semiconductor layer 116. SOI layer 112 and base semiconductor layer 116 may include but are not limited to: silicon, germanium, silicon germanium, silicon carbide. Buried insulator layer 114 may include any appropriate dielectric such as but not limited to silicon dioxide, i.e., forming a buried oxide (BOX) layer. A portion of or the entire semiconductor substrate may be strained. The precise thickness of buried insulating layer 114 and SOI layer 112 may vary widely with the intended application.

An electronic component 120 (FIG. 1 only for clarity) may be formed, for example, in an active region of SOI layer 112, e.g., at a location other than where photonic component 102 is located. Photonic component 102 may be operatively connected and interact with electric component 120 in any now known or later developed fashion. In certain embodiments, photonic component 102 may be positioned in SOI layer 112. In other embodiments, photonic component 120 may be in any layer of a dielectric stack of materials 118 over semiconductor substrate 110. In embodiments, electronic component 120 may be any passive or active device including, e.g., transistors with contacts and metal wiring layers, etc.

Photonic component 102 may be any optical component such as but not limited to at least one of: a photodetector, an avalanche photodiode (APD), an optical waveguide, an optical input/output coupler, and an optical absorber. Photonic component 102 is optically coupled through some sort of optical signal guiding structure, such as an optical waveguide 168, within PIC structure 100 to receive the desired optical signals. The optical signals typically, but not necessarily, travel in a plane of semiconductor substrate 110. Optical signals entering from outside of the optical signal guiding structure are considered undesired or harmful 'stray optical signals' or 'optical noise.'

Figure 3:
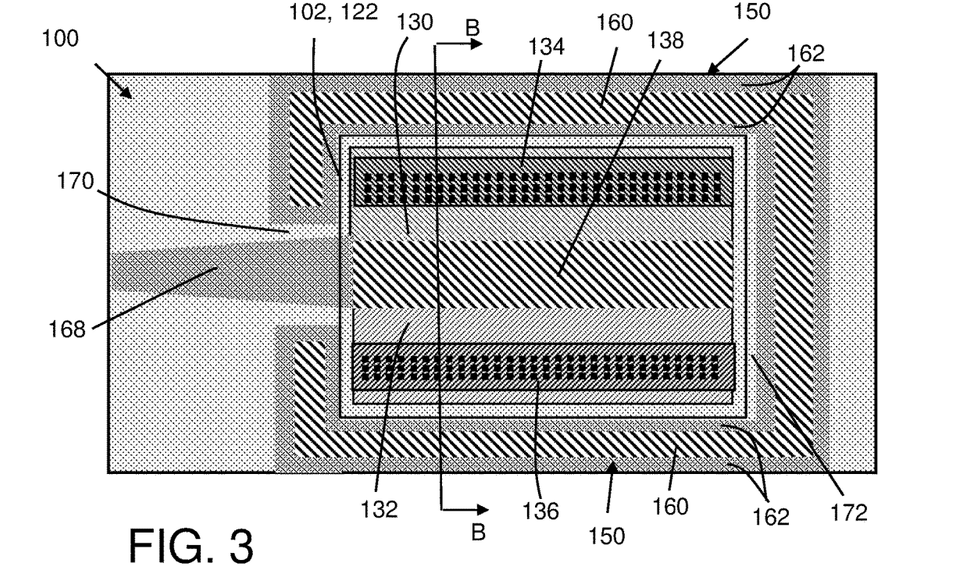
FIG. 3 shows a schematic top-down view of a PIC structure, according to other embodiments of the disclosure.
Figure 4:
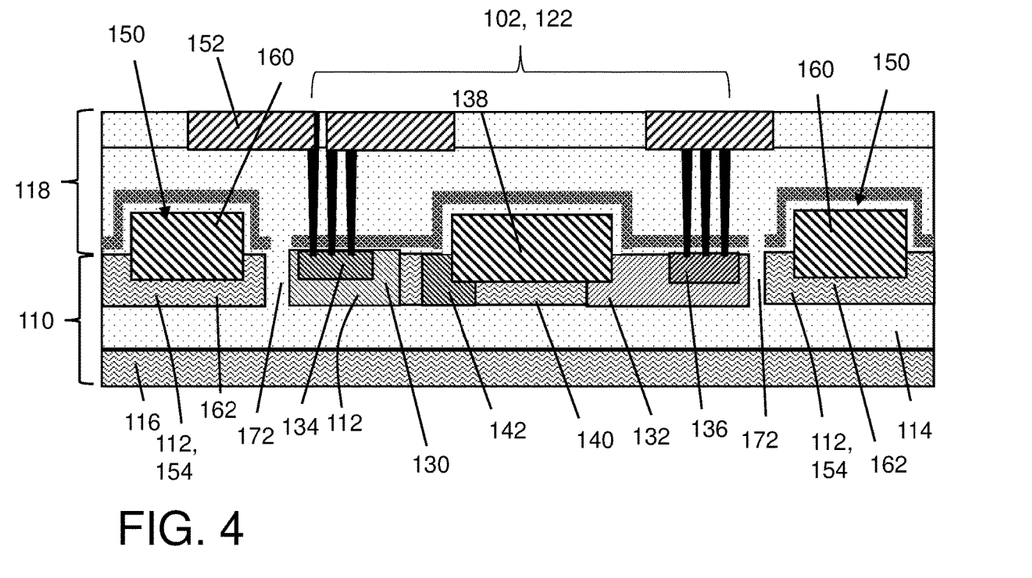
FIG. 4 shows a cross-sectional view of a PIC structure along view line B-B in FIG. 3, according to other embodiments of the disclosure.

For description purposes, as shown in FIGS. 1-7, photonic component 102 is mostly illustrated as some sort of photodetector 122. In other drawings, photonic component 102 is illustrated in a more generic form for ease of illustration. For purposes of illustrations, photodetector 122, as shown in FIGS. 1-2, includes a PN photodetector including a N+ region 130 and a P+ region 132 in SOI layer 112. An N++ region 134 is positioned in N+ region 130 and a P++ region 136 is positioned in P+ region 132. Any number of contacts (black vertical lines) may land on N++ region 134 and P++ region 136 for electric coupling to, for example, a first metal layer 152. Photodetector 122 also includes an (intrinsic) germanium region 138 coupling N+ region 130 and P+ region 132. An undoped region 140 (FIGS. 2, 4, 6, and 7) of SOI layer 112 may separate N+ region 130 and P+ region 132. In FIG. 4, photodetector 122 is in the form of an avalanche photodiode, which also includes a charge region 142 in undoped region 140 of SOI layer 112 and in contact with germanium region 138.

PIC structure 100 also includes a passive optical guard 150 composed of a light absorbing material and in proximity to photonic component 102. While one photonic component 102 is shown in each drawing, photonic component 102 may be one of a plurality of photonic components 102 on semiconductor substrate 110, and passive optical guard 150 (hereafter "guard 150" for brevity) may be in proximity to any number of photonic components 102. More particularly, guard 150 may be applied to any desired one or more photonic components 102 for which stray optical signals are a concern. Hence, passive optical guard 150 may protect a single photonic component 102 amongst a plurality of photonic components in PIC structure 100, or it may protect more than one optical component 102.

As used herein, "in proximity to" indicates guard 150 is in position to absorb the relevant stray optical signals, e.g., light or other radiation, that may affect operation of desired photonic component(s) 102 by being either adjacent to or substantially surround the desired photonic component(s) 102. As used herein, "substantially surround" indicates photonic component(s) 102 is/are surrounded except where some sort or lateral optical communication structure is present, e.g., optical waveguide 168. As shown in FIG. 2, guard 150 includes at least a portion positioned in an active semiconductor layer 154. In FIG. 2, guard 150 may also be entirely below a first metal layer 152. Active semiconductor layer 154 is part of SOI layer 112 and includes active portions of electric components 120 formed therein, e.g., source/drain regions of transistors. As will be further described, guard 150 prevents stray optical signals from reaching photonic component(s) 102. Guard 150 may also be combined with other guard or security structures, such as BEOL interconnect layers, thereover to further prevent stray optical signals from reaching the desired photonic component(s) 102. See e.g., FIG. 17.

Guard 150 can take a variety structural forms and shapes according to embodiments of the disclosure. In FIGS. 1-4, guard 150 may include a germanium body 160 positioned at least partially in a silicon element 162. Germanium body 160 may include monocrystalline (epitaxially grown) or polycrystalline germanium. In certain embodiments, silicon element 162 is positioned in active semiconductor layer 154 (e.g., SOI layer 112) which, as noted, may include doped regions for active portions of electric component 120, but which may be undoped for guard 150. In other embodiments, silicon element 162 may be formed in any layer of PIC structure 100, e.g., in dielectric stack of materials 118. Where guard 150 is partially in active semiconductor layer 154, germanium body 160 may be formed at the same time as germanium region 138 of photodetector 122.

In FIGS. 1-2, guard 150 includes at least a pair of elongated elements 164, 166 extending along opposing sides of photonic component 102. Optical waveguide 168, optionally, may be in optical communication with photonic component 102. Optical waveguide 168 may include any now known or later developed waveguide structures, e.g., silicon or silicon nitride. Optical waveguide 168 laterally directs operative optical signals to photonic component 102. In this embodiment, elongated elements 164, 166 are in contact with photonic component 102; however, an insulator layer such as an oxide may be positioned therebetween (see e.g., FIGS. 3-4).

In contrast to FIG. 1, in FIG. 3, guard 150 may substantially surround photonic component 102. In FIG. 3, optical waveguide 168 in optical communication with photonic component 102 may extend through a gap 170 (FIG. 3) in guard 150. Guard 150 may have any shape configured to prevent stray optical signals from reaching photonic component 102. For example, guard 150 may have a shape selected from: a rectangular ring (FIGS. 1, 3) and a circular ring (see FIGS. 13 and 14), with or without gaps for optical waveguides 168. In FIGS. 3-4, an insulator layer 172, e.g., oxide, may be between photonic component 102 and guard 150.

Figure 5:
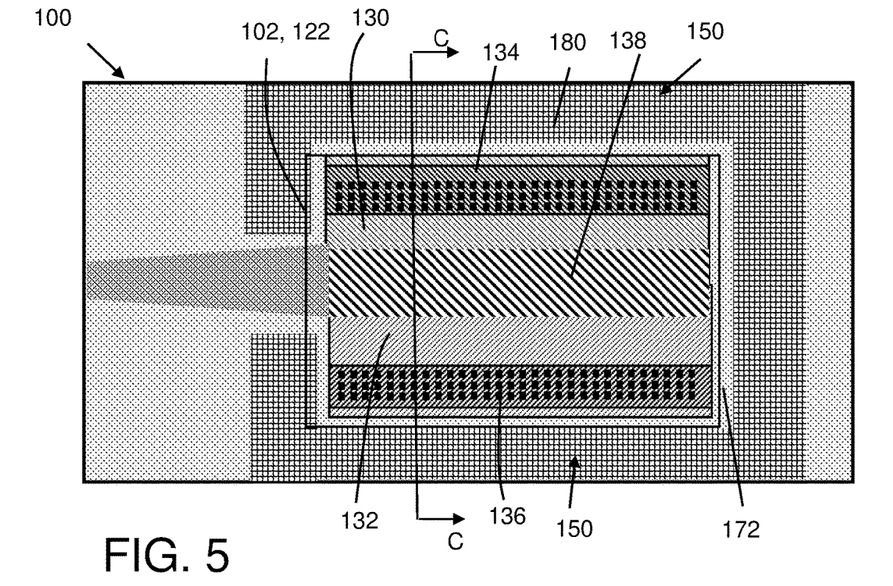
FIG. 5 shows a schematic top-down view of a PIC structure, according to other embodiments of the disclosure.
Figure 6:
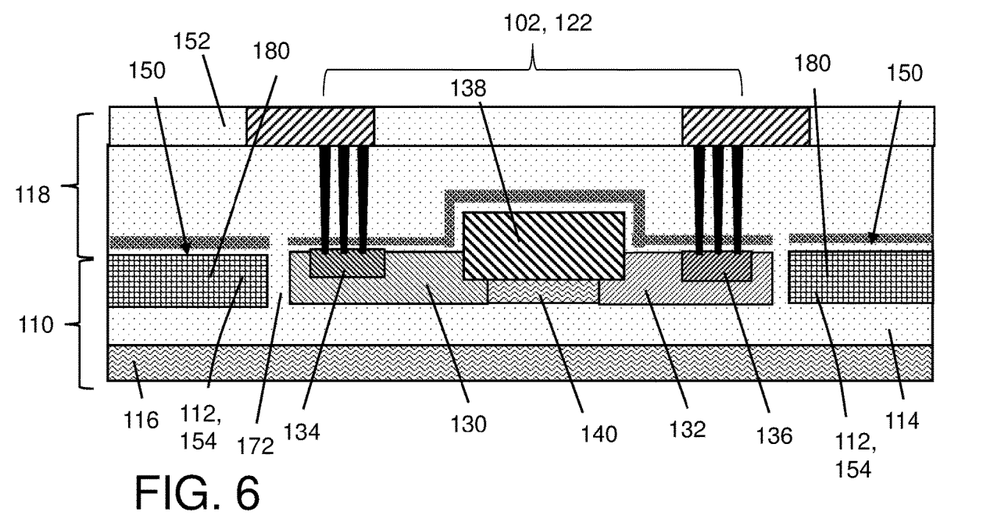
FIG. 6 shows a cross-sectional view of a PIC structure along view line C-C in FIG. 5, according to other embodiments of the disclosure.

FIG. 5 shows a schematic top-down view and FIG. 6 shows a cross-sectional view of PIC structure 100 along view line C-C in FIG. 5, according to embodiments of the disclosure. Referring to FIGS. 5 and 6, in other embodiments, guard 150 may include a silicon body 180. In certain embodiments, silicon body 180 may be positioned in active semiconductor layer 154, i.e., SOI layer 112, which may include doped regions for active portions of electric component 120 (not shown), but which is differently doped for guard 150. In other embodiments, silicon body 180 may be formed in any layer of PIC structure 100, e.g., in dielectric stack of materials 118. In any event, silicon body 180 has a high dopant concentration of, for example, boron, phosphorous, arsenic, indium and/or antimony. Such doping creates free carriers (electrons/holes in conduction band/valence band) which absorb light. Alternatively, silicon can also be doped with lower band gap material such as germanium (0.66 eV band gap) so that it will absorb infrared light used in photonics applications. Regarding silicon body 180, "high dopant concentration" indicates silicon body 180 has dopant concentration of greater than $1\times10^{18}$ per cubic centimeter ($10^{18}/cm^3$). Here, silicon body 180 can be formed during the same processes of other active regions, e.g., for source/drain regions of electric components 120 (FIG. 1) in the form of transistors, in active semiconductor layer 154.

Figure 7:
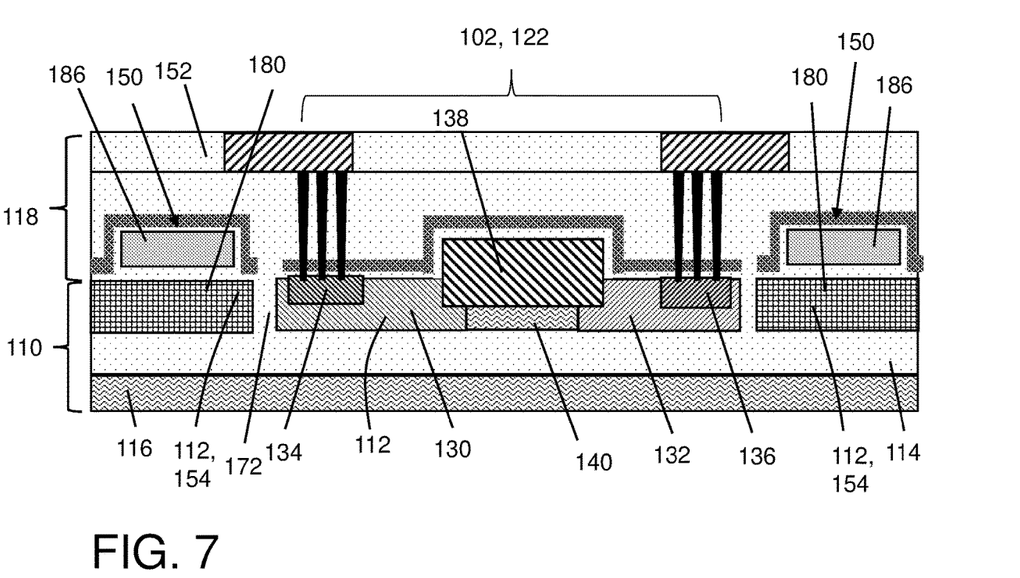
FIG. 7 shows a cross-sectional view of a PIC structure, according to yet other embodiments of the disclosure.

Referring to FIG. 7, in another embodiment, guard 150 may further include a polysilicon body 186 having a high dopant concentration over silicon body 180. In certain embodiments, polysilicon body 186 with silicon body 180 may be positioned in active semiconductor layer 154, i.e., SOI layer 112, which may include doped regions for active portions of electric component 120 (not shown), but which is differently doped for guard 150 with silicon body 180 and polysilicon body 186. In other embodiments, silicon body 180 and polysilicon body 186 may be formed in any layer of PIC structure 100, e.g., in dielectric stack of materials 118. In any event, polysilicon body 186 has a high dopant concentration. Regarding polysilicon body 186, "high dopant concentration" indicates polysilicon body 186 has a dopant concentration of greater than $1\times10^{18}$ per cubic centimeter ($10^{18}/cm^3$). The dopants may include boron, phosphorous, arsenic, indium, antimony, and/or germanium. Here, polysilicon body 186 can be formed during the same processes as other polysilicon regions, e.g., for gate regions of electric components 120 (FIG. 1) in the form of transistors, in active semiconductor layer 154.

In FIGS. 5-7, guard 150 is illustrated as having the same shape as that shown in FIG. 3. However, guard 150 can have any shape described herein, e.g., pair of elements 164, 166 in FIG. 1. In FIGS. 5-7, insulator layer 172 is provided between guard 150 and photonic component 102; however, guard 150 can contact photonic component 102 as in FIGS. 1-2 in these embodiments, if desired.

Figure 8:
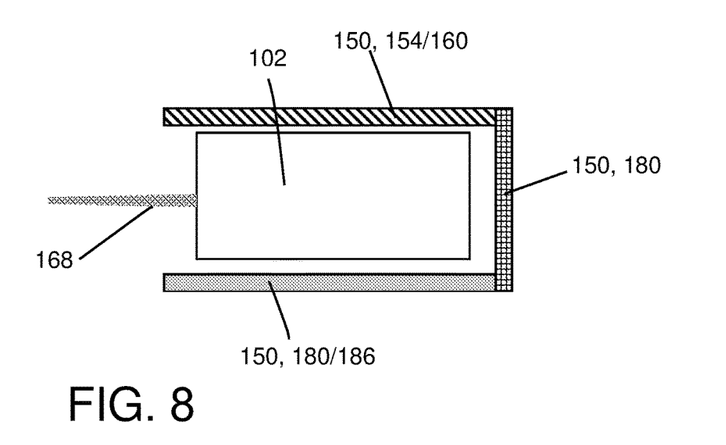
FIG. 8 shows a schematic top-down view of a PIC structure, according to other embodiments of the disclosure.

In another embodiment, as shown schematically in FIG. 8, guard 150 may include more than one of the above-described embodiments. That is, guard 150 may include at least one of: germanium body 160 at least partially in silicon element 162, e.g., in active semiconductor layer 154; silicon body 180, e.g., in active semiconductor layer 154, having a high dopant concentration; and polysilicon body 186 having a high dopant concentration over silicon body 180. Any combination of the embodiments can be used within a single guard 150 and/or a particular PIC structure 100. In any event, a lateral or vertical size of guard 150 can be customized to absorb any desired amount of stray optical signals.

Figure 9:
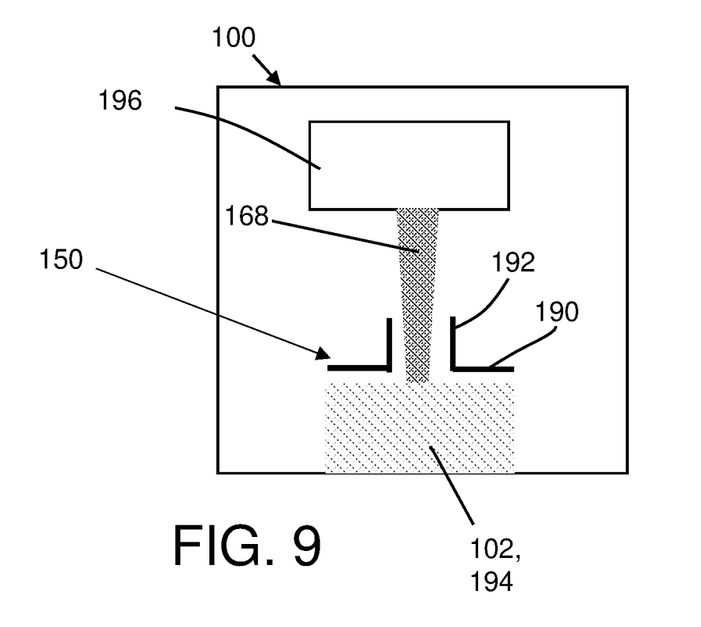
FIG. 9 shows a schematic top-down view of a PIC structure, according to other embodiments of the disclosure.

FIG. 9 shows a schematic view of another embodiment of the disclosure. In FIG. 9, guard 150 has an L-shape having a first leg 190 adjacent a portion of photonic component 102 and a second leg 192 adjacent optical waveguide 168 in optical communication with photonic component 102. Here, a region of concern for optical scatter may be the joint between photonic component 102 in the form of an edge coupler 194, e.g., a V-groove, laser cavity, IOSMF spot size converter, etc., and optical waveguide 168. Optical waveguide 168 may direct optical signals to any variety of other functional components 196, e.g., other electric or photonic components.

Figure 10:
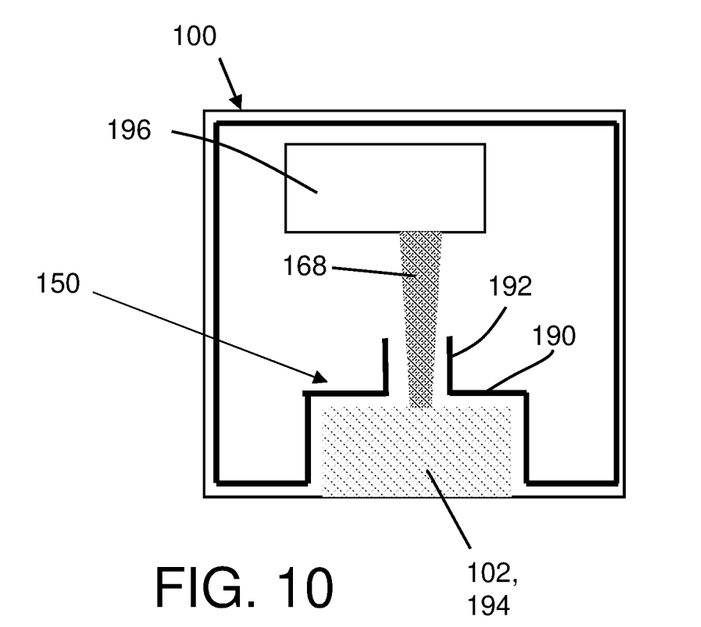
FIG. 10 shows a schematic top-down view of a PIC structure, according to other embodiments of the disclosure.

FIG. 10 shows a schematic view of another embodiment of the disclosure. In FIG. 10, guard 150 has an L-shape having first leg 190 adjacent a portion of an edge coupler 194 (photonic component 102), and second leg 192 adjacent optical waveguide 168 in optical communication with photonic component 102 and other functional components 196, e.g., other electric or photonic components. Here, guard 150 also extends around an entire periphery of PIC structure 100.

Figure 11:
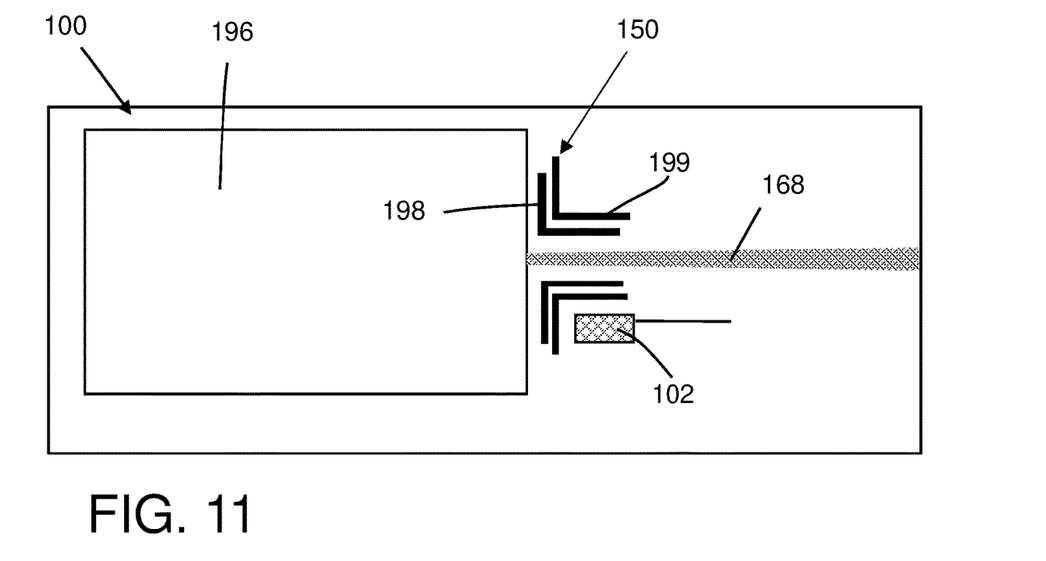
FIG. 11 shows a schematic top-down view of a PIC structure, according to other embodiments of the disclosure.

FIG. 11 shows a schematic view of another embodiment of the disclosure. In FIG. 11, guard 150 includes at least a pair of spaced optical guard elements 198, 199, each including the light absorbing material. While shown as L-shaped elements in FIG. 11, any configuration of spaced optical guard elements is possible. In this example, photonic component 102 may include, for example, a cavity with laser attach. Other functional components 196, e.g., other electric or photonic components, may be on the other side of guard 150.

Figure 12:
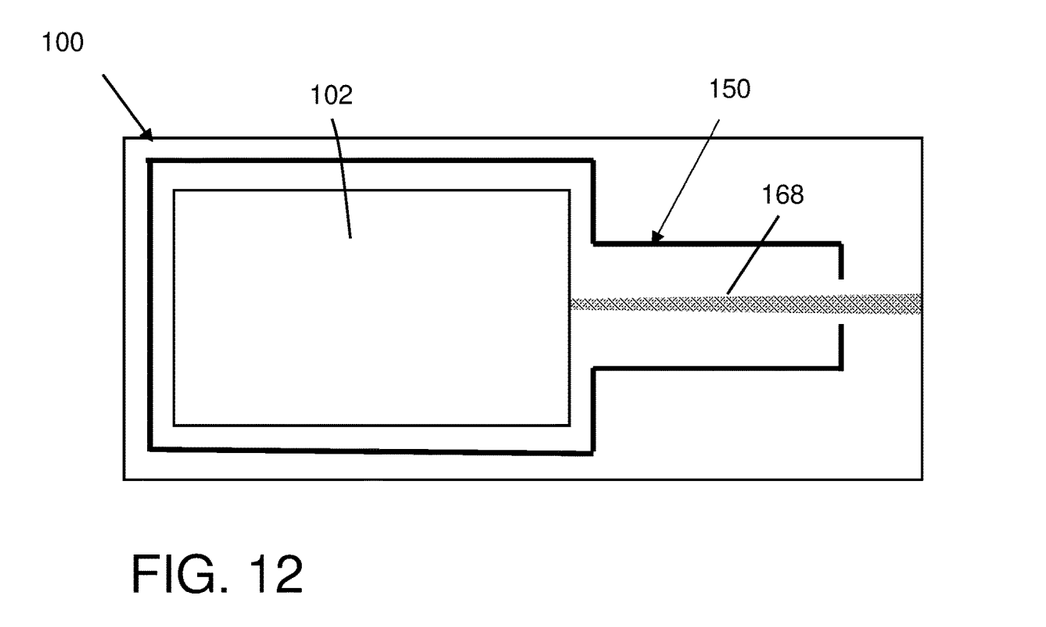
FIG. 12 shows a schematic top-down view of a PIC structure, according to other embodiments of the disclosure.

FIG. 12 shows a schematic view of another embodiment of the disclosure. In FIG. 12, a single photonic component 102, e.g., a cavity for laser attach, is protected by a guard 150 that is shaped to surround photonic component 102 and parts of optical waveguide 168. Guard 150 can have any lateral configuration.

Figure 13:
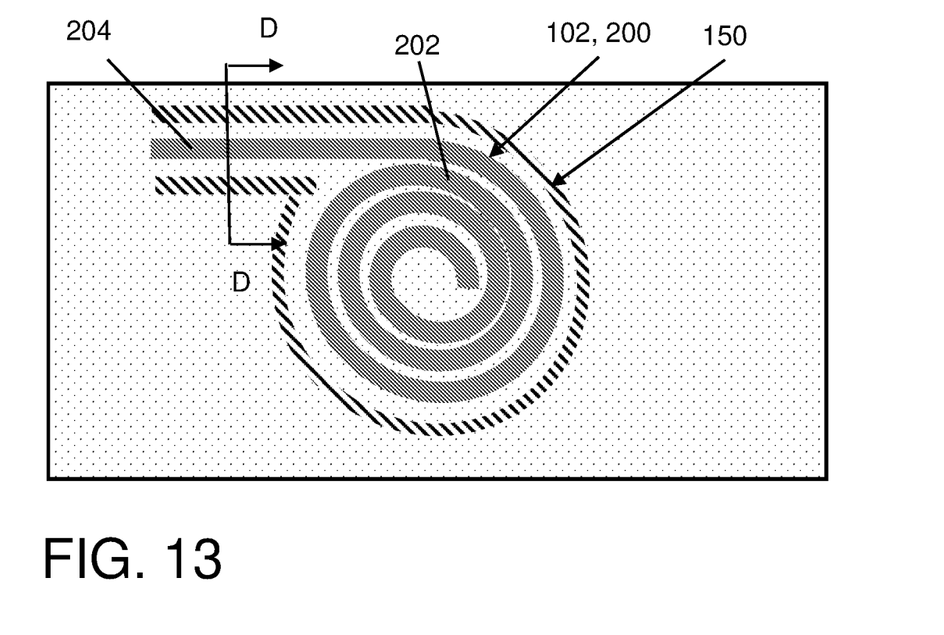
FIG. 13 shows a schematic top-down view of a PIC structure, according to other embodiments of the disclosure.
Figure 14:
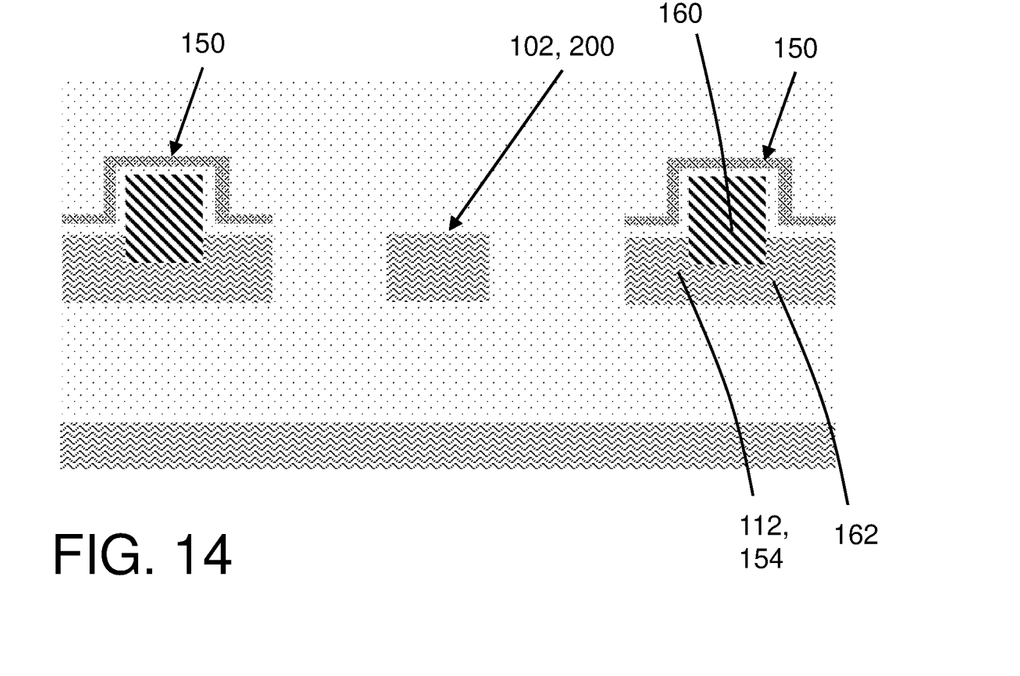
FIG. 14 shows a cross-sectional view of a PIC structure along view line D-D in FIG. 13, according to other embodiments of the disclosure.

FIG. 13 shows a top-down view and FIG. 14 shows a cross-sectional view along view line D-D in FIG. 13 of another embodiment of the disclosure. In FIGS. 13 and 14, photonic component 102 includes an optical absorber 200 including a spiral waveguide body 202 and a linear input waveguide 204 coupled to spiral waveguide body 202. Here, guard 150 surrounds spiral waveguide body 202 and the linear input waveguide 204 and prevents radiation of optical signals in all directions. Guard 150 may absorb optical stray signals resulting in, for example, 50% reduction in optical noise in these embodiments. As shown in FIG. 14, optical absorber 200 includes silicon and may be located in active semiconductor layer 154, e.g., SOI layer 112, with silicon element 162 of guard 150; however, this is not necessary in all cases. While FIGS. 13-14 are shown with the germanium body 160 and silicon element 162 embodiment of guard 150, the teachings are equally applicable to the other embodiments of FIGS. 5-7.

Figure 15:
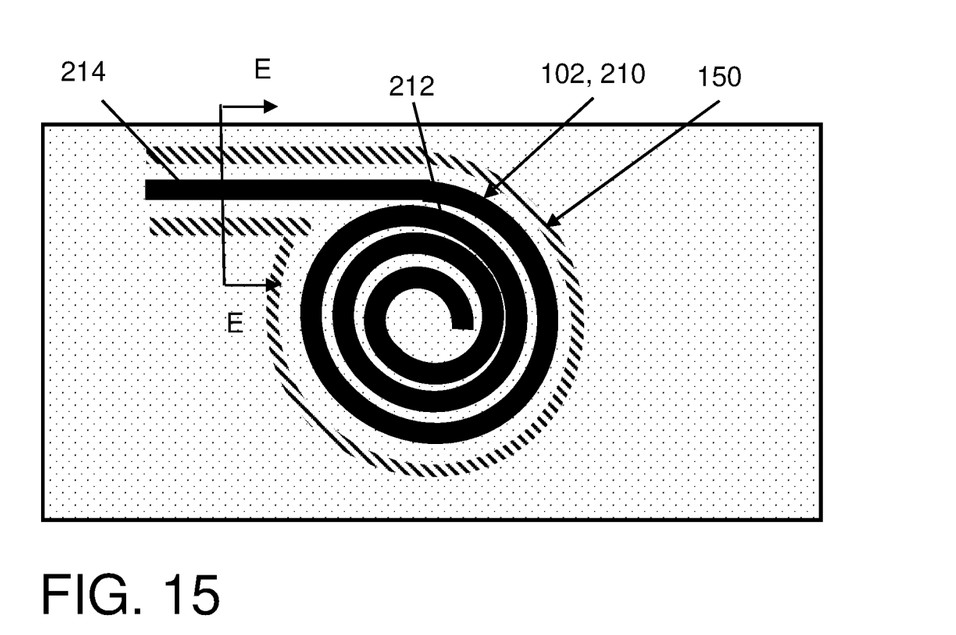
FIG. 15 shows a schematic top-down view of a PIC structure, according to other embodiments of the disclosure.
Figure 16:
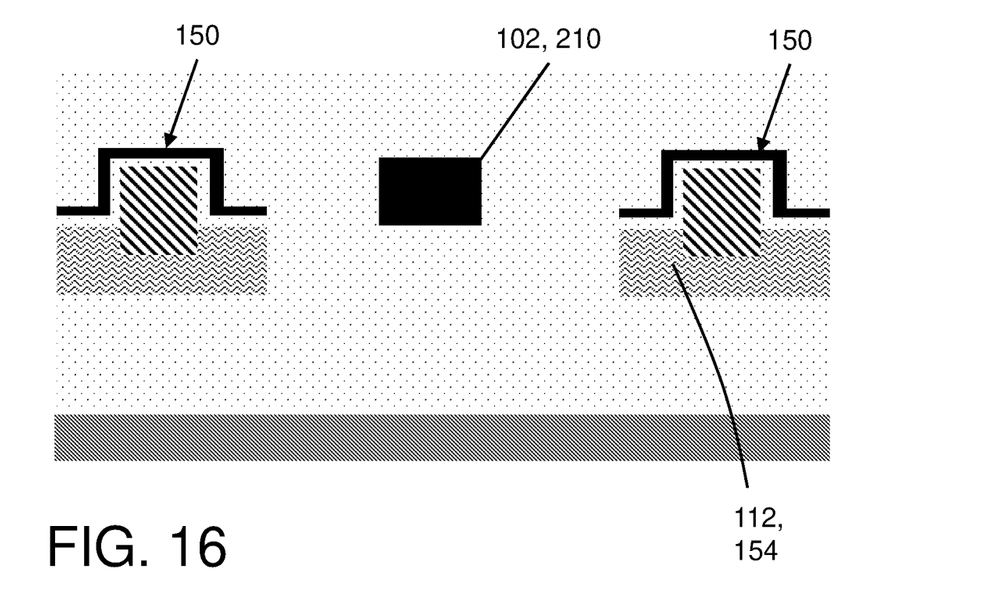
FIG. 16 shows a cross-sectional view of a PIC structure along view line E-E in FIG. 15, according to other embodiments of the disclosure.

FIG. 15 shows a top-down view and FIG. 16 shows a cross-sectional view along view line E-E in FIG. 15 of another embodiment of the disclosure. In FIGS. 15 and 16, photonic component 102 includes an optical absorber 210 including a spiral waveguide body 212 and a linear input waveguide 214 coupled to spiral waveguide body 212. Here, guard 150 surrounds spiral waveguide body 212 and the linear input waveguide 214 and prevents radiation of optical signals in all directions. Guard 150 may absorb optical stray signals resulting in, for example, 50% reduction in optical noise in these embodiments. As shown in FIG. 16, optical absorber 210 may include silicon nitride and may be located above active semiconductor layer 154. While FIGS. 15-16 are shown with the germanium body 160 and silicon element 162 embodiment, the teachings are equally applicable to the other embodiments of FIGS. 5-7.

Figure 17:
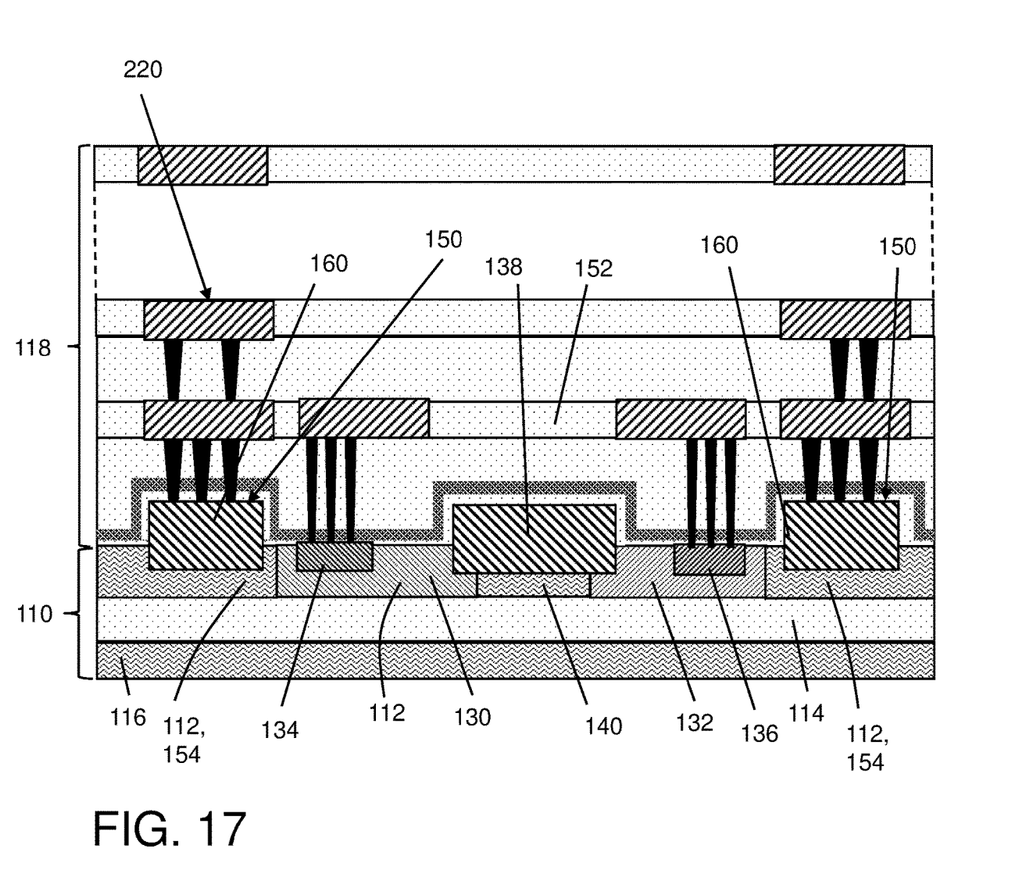
FIG. 17 shows a cross-sectional view of a PIC structure, according to other embodiments of the disclosure.

FIG. 17 shows a cross-sectional view of another embodiment in which guard 150 is combined with a metal guard ring 220 formed in BEOL layers, e.g., dielectric stack of materials 118. Metal guard ring 220 may include any now known or later developed combination of metal and via layers. Metal guard ring 220 may reflect optical signals, and aid guard 150 from preventing stray optical signals from reaching photonic component(s) 120.

Figure 18:
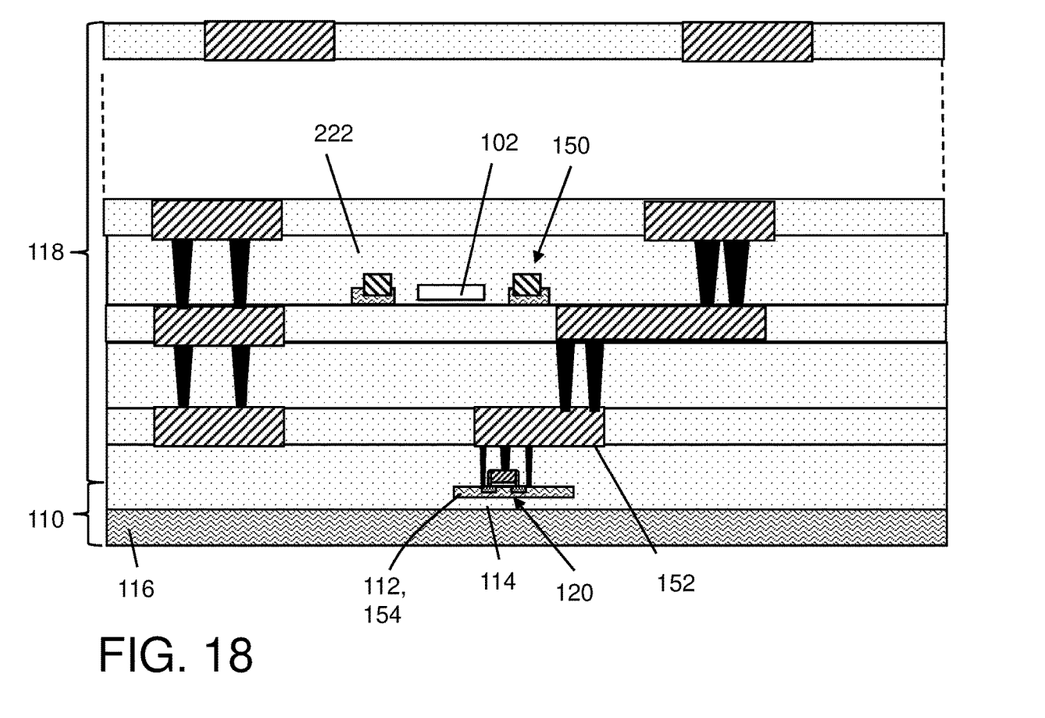
FIG. 18 shows a cross-sectional view of a PIC structure, according to other embodiments of the disclosure.

FIG. 18 shows a cross-sectional view of another embodiment in which guard 150 is positioned in a BEOL layer 222 in dielectric stack of materials 118. Guard 150 can be in any layer of dielectric stack of materials 118 in which a photonic component 102 exists.

Figure 19:
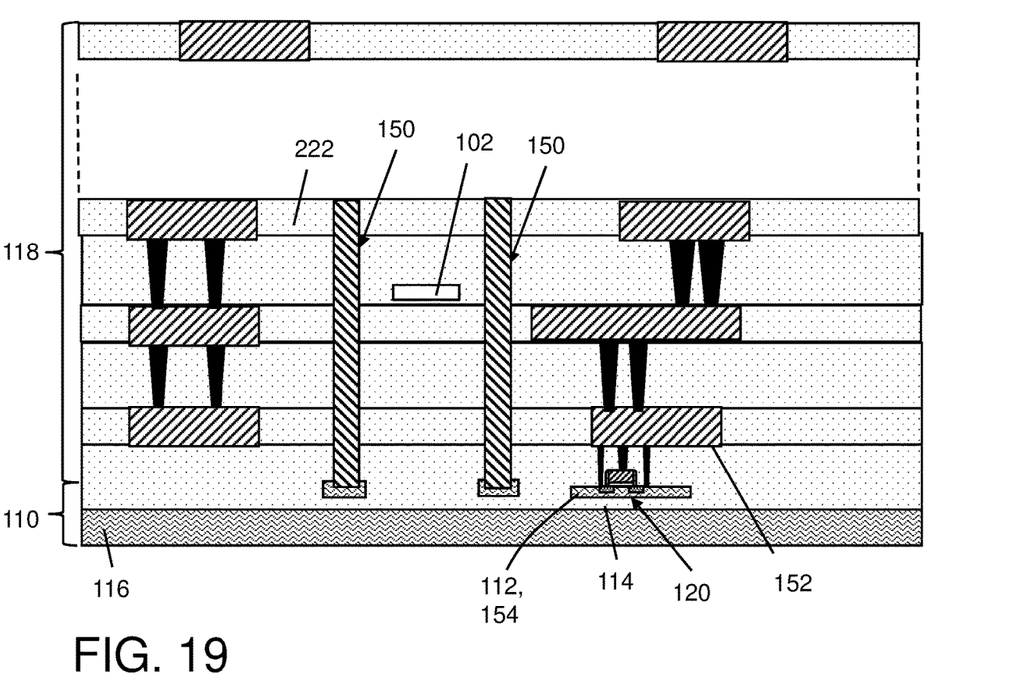
FIG. 19 shows a cross-sectional view of a PIC structure, according to other embodiments of the disclosure.

FIG. 19 shows a cross-sectional view of another embodiment in which guard 150 is positioned with at least a portion in active semiconductor layer 154 but extends into a BEOL layer(s) 222 in dielectric stack of materials 118. Guard 150 can extend into and/or through any number of layers of dielectric stack of materials 118. Photonic component 102 can exist in any layer.

A method according to embodiments of the disclosure may include forming photonic component 102 on semiconductor substrate 110. This process may include any now known or later developed fabrication processes appropriate for the photonic component(s) 102 to be formed. For example, for photodetector 122 (FIGS. 1-2), the process may include forming germanium region 138 between n-type region 130 and p-type region 132 where n-type and p-type regions are in semiconductor substrate 110. The photonic component 102 formation processes may use any now known or later developed semiconductor fabrication techniques, e.g., depositing material layers, doping, patterning using photolithography and etching, among others.

The process may also include forming passive optical guard 150 in proximity to photonic component(s) 102. In certain embodiments, guard 150 includes at least a portion in active semiconductor layer 154. In certain embodiments, guard 150 may be entirely below first metal layer 152. In other embodiments, guard 150 may be positioned in a BEOL layer in proximity to photonic component 102, see FIG. 18. For the germanium body 160 with silicon element 162 embodiment, the forming guard 150 may include forming germanium body 160 positioned at least partially in silicon element 162 in active semiconductor layer 154 of semiconductor substrate 110 adjacent photonic component 102. Here, forming germanium region 138 and germanium body 160 may occur simultaneously. A trench may be formed in silicon element 162 and germanium body 160 may be formed therein, e.g., by epitaxy.

In alternative embodiments, forming guard 150 adjacent photonic component(s) 102 includes forming at least one of: germanium body 160 positioned at least partially in silicon element 162 in active semiconductor layer 154 of semiconductor substrate 110 adjacent photonic component(s) 102, silicon body 180 having a high dopant concentration in active semiconductor layer 154, and polysilicon body 186 having a high dopant concentration over silicon body 180 in active semiconductor layer 154. As shown in FIG. 1, guard 150 may include a pair of elongated elements 164, 166 extending along opposing sides of photonic component(s) 102. As shown in FIG. 3, guard 150 may substantially surround photonic component(s) 102. As shown in FIG. 11, guard 150 may include at least a pair of spaced optical guard elements 198, 199, each including the light absorbing material. Guard 150 forming processes may use any now known or later developed semiconductor fabrication techniques, e.g., depositing material layers, doping, patterning using photolithography and etching, among others.

Embodiments of the disclosure provide various technical and commercial advantages, examples of which are discussed herein. Guard 150 reduces optical noise and provides performance improvements for functional components and circuits (e.g., dark current reduction, scattering loss reduction). The guard is fully compatible with current semiconductor process flows and does not require additional layers and/or process steps. The guard can be placed in any area where stray optical signals (light scattering) are anticipated, such as but not limited to in proximity to optical input/outputs such as an edge coupler, laser cavity/coupler, V-groove/IOSMF, grating coupler, or chip edges; in proximity to waveguide bends, couplers, splitters, spiral absorbers, etc.; and/or surrounding sensitive photonic components such as photodetectors and/or optical modulators.

The method as described above is used in the fabrication of photonic integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A photonic integrated circuit (PIC) structure, comprising:
   a photonic component, wherein at least a portion of the photonic component is positioned in an active semiconductor layer of a semiconductor substrate;
   a passive optical guard composed of a light absorbing material and in proximity to the photonic component, wherein the passive optical guard includes at least a portion positioned in the active semiconductor layer of the semiconductor substrate, and wherein the passive optical guard is entirely below a first metal layer and above a base semiconductor layer of the PIC structure; and
   an insulator layer separating the photonic component and the passive optical guard.

2. The PIC structure of claim 1, wherein the passive optical guard substantially surrounds the photonic component, wherein the photonic component is one of a plurality of photonic components in the PIC structure.

3. The PIC structure of claim 2, further comprising an optical waveguide extending through a gap in the passive optical guard, the optical waveguide in optical communication with the photonic component.

4. The PIC structure of claim 1, wherein the passive optical guard includes a pair of elongated elements extending along opposing sides of the photonic component.

5. The PIC structure of claim 1, wherein the passive optical guard includes a germanium body positioned at least partially in a silicon element.

6. The PIC structure of claim 5, wherein the silicon element is positioned in the active semiconductor layer.

7. The PIC structure of claim 1, wherein the passive optical guard includes a silicon body in the active semiconductor layer and having a high dopant concentration.

8. The PIC structure of claim 7, wherein the optical guard further includes a polysilicon body having a high dopant concentration over the silicon body.

9. The PIC structure of claim 1, wherein the passive optical guard includes at least one of: a germanium body positioned at least partially in a silicon element in the active semiconductor layer, a silicon body in the active semiconductor layer having a high dopant concentration, and a polysilicon body having a high dopant concentration over the silicon body.

10. The PIC structure of claim 1, wherein the photonic component includes an optical absorber including a spiral waveguide body and a linear input waveguide coupled to the spiral waveguide body, and wherein the passive optical guard surrounds the spiral waveguide body and the linear input waveguide.

11. The PIC structure of claim 1, wherein the passive optical guard includes at least a pair of spaced optical guard elements, each including the light absorbing material.

12. The PIC structure of claim 1, wherein the passive optical guard has an L-shape having a first leg adjacent a portion of the photonic component, and a second leg adjacent a waveguide in optical communication with the photonic component.

13. The PIC structure of claim 1, wherein the photonic component includes at least one of: a photodetector, an avalanche photodiode (APD), an optical waveguide, an optical input/output coupler, and an optical absorber.

14. A photonic integrated circuit (PIC) structure, comprising:
    a photonic component, wherein at least a portion of the photonic component is positioned in an active layer of a semiconductor substrate;
    a passive optical guard composed of a light absorbing material and in proximity to the photonic component, the passive optical guard entirely below a first metal layer and above a base semiconductor layer of the PIC structure and including at least a portion in the active semiconductor layer of the semiconductor substrate; and
    an insulator layer separating the photonic component and the passive optical guard, wherein the insulator layer includes an oxide,
    wherein the passive optical guard includes at least one of: a germanium body positioned at least partially in a silicon element in the active semiconductor layer, a silicon body having a high dopant concentration in the active semiconductor layer, and a polysilicon body having a high dopant concentration over the silicon body.

15. A photonic integrated circuit (PIC) structure, comprising:
    a silicon-on-insulator (SOI) substrate including an active semiconductor layer, a base semiconductor layer, and an insulating layer separating the active semiconductor layer from the base semiconductor layer;
    a photonic component positioned at least partially in the active semiconductor layer of the SOI substrate;
    a passive optical guard composed of a light absorbing material and in proximity to the photonic component, wherein the passive optical guard includes at least a portion positioned in the active semiconductor layer of the SOI substrate, and wherein the passive optical guard is entirely below a first metal layer and above a base semiconductor layer of the PIC structure; and
    an insulator layer separating the photonic component and the passive optical guard.

16. The PIC structure of claim 15, wherein the passive optical guard includes a germanium body positioned at least partially in a silicon element, and wherein the silicon element is positioned in the active semiconductor layer of the SOI substrate.

17. The PIC structure of claim 15, wherein the passive optical guard includes a silicon body in the active semiconductor layer of the SOI substrate and having a high dopant concentration.

18. The PIC structure of claim 17, wherein the optical guard further includes a polysilicon body having a high dopant concentration over the silicon body.

19. The PIC structure of claim 1, wherein the insulator layer separating the photonic component and the passive optical guard includes an oxide.

20. The PIC structure of claim 15, wherein the insulator layer separating the photonic component and the passive optical guard includes an oxide.

* * * * *